UNITED STATES PATENT OFFICE.

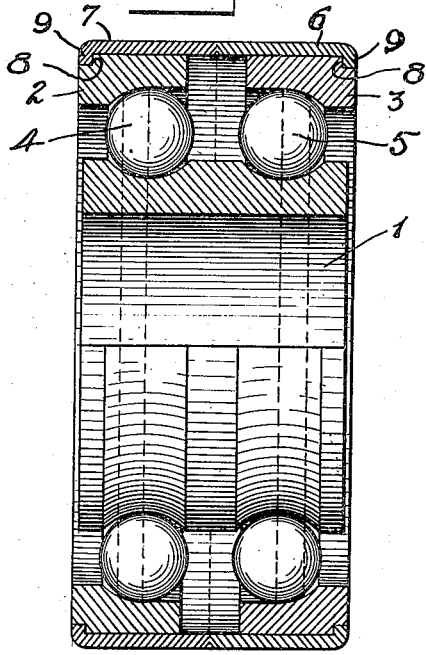
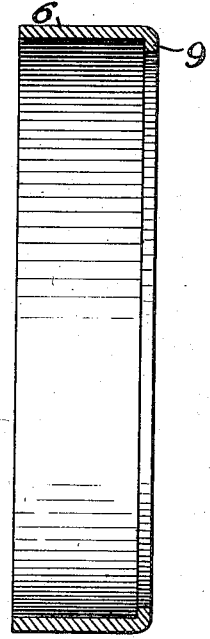
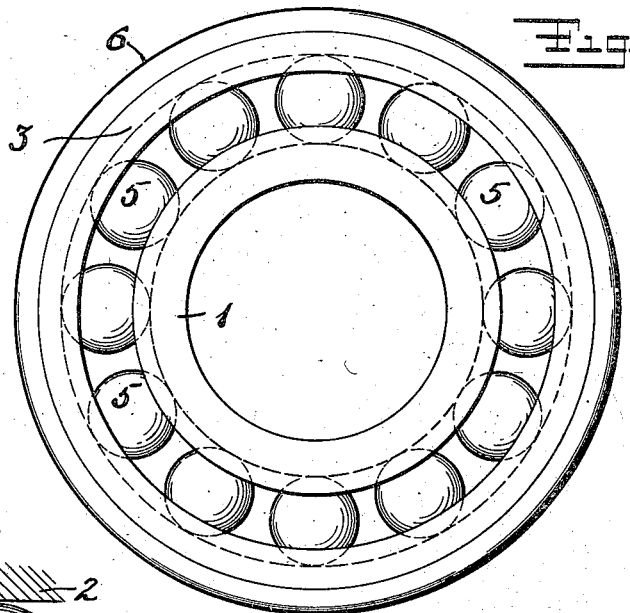
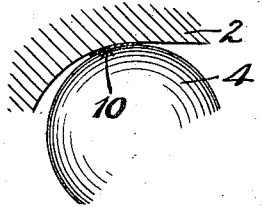

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-BEARING.

1,375,112.    Specification of Letters Patent.    Patented Apr. 19, 1921.

Application filed October 19, 1920. Serial No. 417,942.

*To all whom it may concern:*

Be it known that I, RAYMOND R. SEARLES, a citizen of the United States of America, residing at New Britain, Hartford county, Connecticut, have invented a new and useful Ball-Bearing, of which the following is a specification.

My invention relates to a ball bearing construction, and is particularly adapted to double row ball bearings, though it is, of course, not limited thereto.

My invention in its preferred form includes inner and outer bearing rings having complementary race ways therein, one of said rings being made in sections. Each of said sections is provided with a sleeve suitably secured or held thereto. After the balls have been assembled in the rings, the sleeves on the sections are welded together to form a complete bearing ring.

In the drawings which show merely a preferred form of my invention,

Figure 1 is an edge view of a bearing, parts being shown in section.

Fig. 2 is a side elevation thereof.

Fig. 3 is a sectional view of a sleeve which coöperates with one of the bearing rings.

Fig. 4 is an edge elevation of a shim.

Fig. 5 is an enlarged fragmentary view of a ball and part of a ring showing a shim interposed therebetween.

In the preferred form shown in the drawings, 1 indicates an inner bearing ring having two race ways therein. One of the rings, preferably the outer, is made in two sections 2—3, each of which has a race way therein complementary to the races in the inner ring. 4—5 indicate the balls of two separate series. 6—7 indicate sleeves secured to the sections 2—3 of the outer bearing ring. Each of the sections is provided with a shoulder 8 and each sleeve is provided with a flange 9 which abuts the shoulder 8. 10 indicates any suitable form of shim which may or may not be used in assembling and forming this bearing.

In assembling the bearing shown, the sleeves 6—7 are slipped over the sections of the outer bearing rings and are held, in the form shown, by means of the shoulders 8 and flanges 9. The outer sections are separated sufficiently to permit the introduction of the balls 4—5 in the ball races. If desired, suitable shims such as 10 may be interposed between the balls and one of the bearing rings. The edges of the two sleeves are next brought together and suitable electric welding apparatus is then applied and the two sleeves are welded together as indicated at 11. The welding pressure and temperature are maintained until the sections engage the balls in the race ways with the desired degree of pressure.

It will be noted that the welding heat is concentrated at the point of contact of the sleeves, and consequently the bearing rings themselves will not be over-heated nor warped. The shim 10, which may be of paper, or in any form of film, such as set forth in R. W. Sellew's application, Serial No. 383,524, filed May 22nd, 1920, may next be removed from the bearing as by tearing or dissolving it away.

It will be seen that the space formed between the ring sections and the sleeves forms a convenient pocket for the retention of grease or other lubricant in the bearing. It will be obvious that the shims may, if desired, be dispensed with and the ring sections brought together until the pressure on the balls attains the desired amount after which the pressure should of course be relieved.

While there are certain advantages in the way of accessibility in forming the outer ring in sections, a very obvious alternative method would be to form an inner ring in sections. This modification is obvious and constitutes merely an alternative method so that a separate illustration thereof is thought to be unnecessary.

I claim:

1. In a ball bearing, an inner bearing ring having a race way therein, an outer ring having a complementary race way therein, one of said rings being made in sections, a sleeve on each of said sections, said sleeves being welded together.

2. In a ball bearing, inner and outer bearing rings having complementary race ways therein, one of said rings being formed in sections, a sleeve secured to each of said sections, said sleeves being welded together after the bearing is assembled.

3. In a ball bearing, inner and outer bearing rings having complementary race ways therein, one of said rings being made in sections, a flanged sleeve secured to each of said sections, said sleeves being welded together after the bearing is assembled.

4. In a ball bearing, inner and outer bearing rings having complementary race ways therein, one of said rings being made in ring sections, a sleeve secured to each of said sections, said sleeves being welded together to form a complete bearing ring and providing a pocket between said sections and said sleeves.

5. In a ball bearing, an inner bearing ring having a race way therein, an outer bearing ring having a complementary race way therein, said outer bearing ring being made in sections, a sleeve secured to each of said sections, said sleeves being welded together to form a complete outer bearing ring.

6. In a ball bearing, inner and outer bearing rings having complementary race ways therein, one of said rings being made in sections, each of said sections having a shoulder thereon, a flanged sleeve engaging each of said sections with the flanges abutting said shoulders, said sleeves being welded together to form a complete bearing ring.

RAYMOND R. SEARLES.